US012154514B2

(12) United States Patent
Su et al.

(10) Patent No.: US 12,154,514 B2
(45) Date of Patent: Nov. 26, 2024

(54) SOURCE DRIVER AND METHOD FOR COLOR SWAPPING

(71) Applicant: SAMSUNG ELECTRONICS CO., LTD., Suwon-si (KR)

(72) Inventors: Skaut Su, Zhubei (TW); Alvin Lee, Zhubei (TW); Donken Huang, Zhubei (TW); Chris Huang, Zhubei (TW); Jason Ding, Zhubei (TW); Kyunlyeol Lee, Zhubei (TW)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/139,079

(22) Filed: Apr. 25, 2023

(65) Prior Publication Data

US 2024/0119906 A1 Apr. 11, 2024

(30) Foreign Application Priority Data

Oct. 5, 2022 (TW) ................................. 111137853
Dec. 6, 2022 (KR) ........................ 10-2022-0168615

(51) Int. Cl.
*G09G 3/3275* (2016.01)

(52) U.S. Cl.
CPC ... *G09G 3/3275* (2013.01); *G09G 2310/0297* (2013.01); *G09G 2320/0673* (2013.01)

(58) Field of Classification Search
None
See application file for complete search history.

(56) References Cited

U.S. PATENT DOCUMENTS 6,441,829 B1 * 8/2002 Blalock ................ G09G 3/3688 345/99
8,306,321 B2 11/2012 Yamamoto
8,704,847 B2 4/2014 Higgins et al.
8,866,799 B2 10/2014 Jun et al.
9,189,181 B2 11/2015 Kouguchi
9,460,681 B2 10/2016 Hwang et al.
11,158,280 B2 10/2021 Kuo et al.
(Continued)

FOREIGN PATENT DOCUMENTS

JP 2007-307743 A 11/2007

*Primary Examiner* — Nitin Patel
*Assistant Examiner* — Amen W Bogale
(74) *Attorney, Agent, or Firm* — Sughrue Mion, PLLC

(57) ABSTRACT

A source driver and a method for color swapping are provided. The source driver includes: a processor configured to: obtain, from an application processor, a plurality of sub-pixel data, add a tag to each of the plurality of sub-pixel data to generate a plurality of new sub-pixel data, the tag indicating color information of the sub-pixel data, and perform color swapping on the plurality of new sub-pixel data; a multiplexer circuit communicatively coupled to the processor and configured to: obtain each of the plurality of color swapped new sub-pixel data in sequence, and select a corresponding gamma voltage according to the tag of the color swapped new sub-pixel data; and an analog amplifier circuit communicatively coupled to the multiplexer circuit and configured to provide a source driving signal to a corresponding sub-pixel in a pixel array according to the color swapped new sub-pixel data and the corresponding gamma voltage.

14 Claims, 5 Drawing Sheets

| NO-MUX Source channel | S1 | S2 | S3 | S4 | S5 | S6 | S7 | S8 |
|---|---|---|---|---|---|---|---|---|
| ODD_Line | R1 | G1 | B2 | G2 | R3 | G3 | B4 | G4 |
| EVEN_Line | B2 | G1 | R1 | G2 | B4 | G3 | R3 | G4 |

| 2MUX Source channel | S1 | S2 | S3 | S4 |
|---|---|---|---|---|
| ODD_Line-MUX0 | R1 | B2 | R3 | B4 |
| ODD_Line-MUX1 | G1 | G2 | G3 | G4 |
| EVEN_Line-MUX0 | B2 | R1 | B4 | R3 |
| EVEN_Line-MUX1 | G1 | G2 | G3 | G4 |

(56) References Cited

U.S. PATENT DOCUMENTS

| | | | | |
|---|---|---|---|---|
| 2003/0234758 | A1* | 12/2003 | Bu | G09G 3/3648 345/90 |
| 2008/0186325 | A1* | 8/2008 | Higgins | G09G 5/28 345/592 |
| 2014/0218388 | A1 | 8/2014 | Higgins et al. | |
| 2022/0293033 | A1* | 9/2022 | Kim | G09G 3/2003 |

* cited by examiner

| | | | | | | | | |
|---|---|---|---|---|---|---|---|---|
| ODD_Line | R1 | G1 | B2 | G2 | R3 | G3 | B4 | G4 |
| EVEN_Line | B2 | G1 | R1 | G2 | B4 | G3 | R3 | G4 |

| | | | | | | | | |
|---|---|---|---|---|---|---|---|---|
| ODD_Line | B2 | G1 | R1 | G2 | B4 | G3 | R3 | G4 |
| EVEN_Line | R1 | G1 | B2 | G2 | R3 | G3 | B4 | G4 |

| | | | | | | | | |
|---|---|---|---|---|---|---|---|---|
| ODD_Line | R3 | G4 | B4 | G3 | R1 | G2 | B2 | G1 |
| EVEN_Line | B4 | G4 | R3 | G3 | B2 | G2 | R1 | G1 |

| | | | | | | | | |
|---|---|---|---|---|---|---|---|---|
| ODD_Line | B4 | G4 | R3 | G3 | B2 | G2 | R1 | G1 |
| EVEN_Line | R3 | G4 | B4 | G3 | R1 | G2 | B2 | G1 |

| | | | | | | | | |
|---|---|---|---|---|---|---|---|---|
| ODD_Line | G1 | B2 | G2 | R1 | G3 | B4 | G4 | R3 |
| EVEN_Line | G1 | R1 | G2 | B2 | G3 | R3 | G4 | B4 |

| | | | | | | | | |
|---|---|---|---|---|---|---|---|---|
| ODD_Line | G1 | R1 | G2 | B2 | G3 | R3 | G4 | B4 |
| EVEN_Line | G1 | B2 | G2 | R1 | G3 | B4 | G4 | R3 |

| | | | | | | | | |
|---|---|---|---|---|---|---|---|---|
| ODD_Line | G4 | B4 | G3 | R3 | G2 | B2 | G1 | R1 |
| EVEN_Line | G4 | R3 | G3 | B4 | G2 | R1 | G1 | B2 |

| | | | | | | | | |
|---|---|---|---|---|---|---|---|---|
| ODD_Line | G4 | R3 | G3 | B4 | G2 | R1 | G1 | B2 |
| EVEN_Line | G4 | B4 | G3 | R3 | G2 | B2 | G1 | R1 |

FIG. 2

| | | | | | | | | | | | | |
|---|---|---|---|---|---|---|---|---|---|---|---|---|
| ND[11:0] | [11] | [10] | [9] | [8] | [7] | [6] | [5] | [4] | [3] | [2] | [1] | [0] |
| | TAG[1:0] | | D[9:0] | | | | | | | | | |

FIG. 5

SOURCE DRIVER AND METHOD FOR COLOR SWAPPING

CROSS-REFERENCE TO RELATED APPLICATION

This application claims priority to Taiwanese Patent Application No. 111137853, filed on Oct. 5, 2022, in the Taiwan Intellectual Property Office, and from Korean Patent Application No. 10-2022-0168615, filed on Dec. 6, 2022 in the Korean Intellectual Property Office, the disclosure of which is incorporated by reference herein in its entirety.

BACKGROUND

1. Field

The present disclosure relates generally to display panels, and more particularly, to a source driver and a method for color swapping.

2. Description of Related Art

In terms of organic light emitting diode (OLED) applications, color swapping is an important function, because the RGB data input from an application processor (AP) may need to be converted into RGB-type data for OLED panels. In general, the odd-numbered display lines output by the source channel may have an RGBG format, and the even-numbered display lines output by the source channel may have the BGRG format. Consequently, the odd-numbered display lines and the even-numbered display lines may need to be subjected to color swapping to, for example, swap the RGBG format for the BGRG format. Furthermore, if the panel is flipped horizontally or vertically, the source channel output may also need to be subjected to different color swapping. Also, if the client uses a different PenTile™ panel architecture, the practice of color swapping may be different as well.

A source channel is a channel that transmits mixed data of RGB data and gamma voltage. In particular, gamma voltage adjustment may be important for color correction. For example, generally, RGB colors may need their own gamma voltage settings for color correction. Therefore, if the RGB data is color-swapped, the gamma voltages may also need to be color-swapped accordingly to match the correct RGB color. Based on the above, there may be a large number (e.g., more than 100) of types of color swapping, which may increase the complexity of circuit design.

Accordingly, there exists a need for further improvements in color swapping techniques, that may reduce the chip area and/or circuit complexity.

SUMMARY

Example embodiments provided a source driver and a method for color swapping, in which a tag for indicating color information is added to each sub-pixel data. In this manner, after color swapping is performed, the corresponding gamma voltage may be selected according to the tag, thereby reducing chip area and circuit complexity.

According to an aspect of an embodiment, a source driver includes: a processor configured to: obtain, from an application processor, a plurality of sub-pixel data, add a tag to each of the plurality of sub-pixel data to generate a plurality of new sub-pixel data, the tag indicating color information of the sub-pixel data, and perform color swapping on the plurality of new sub-pixel data; a multiplexer circuit communicatively coupled to the processor and configured to: obtain each of the plurality of color swapped new sub-pixel data in sequence, and select a corresponding gamma voltage according to the tag of the color swapped new sub-pixel data; and an analog amplifier circuit communicatively coupled to the multiplexer circuit and configured to provide a source driving signal to a corresponding sub-pixel in a pixel array according to the color swapped new sub-pixel data and the corresponding gamma voltage.

According to an aspect of an embodiment, a method for performing color swapping, adaptable for a display panel, includes: obtaining, from an application processor of the display panel, a plurality of sub-pixel data; adding a tag to each of the plurality of sub-pixel data to generate a plurality of new sub-pixel data, the tag indicating color information of the sub-pixel data; performing color swapping on the plurality of new sub-pixel data; obtaining each of the plurality of color swapped new sub-pixel data in sequence; selecting a corresponding gamma voltage according to the tag of the color swapped new sub-pixel data; and providing a source driving signal to a corresponding sub-pixel in a pixel array according to the color swapped new sub-pixel data and the corresponding gamma voltage.

According to an aspect of an embodiment, a non-transitory computer-readable storage medium stores computer-executable instructions for performing color swapping by a display panel, the non-transitory computer-executable instructions being configured to, when executed by at least one processor of the display panel, cause the display panel to: obtain, from an application processor, a plurality of sub-pixel data; add a tag to each of the plurality of sub-pixel data to generate a plurality of new sub-pixel data, the tag indicating color information of the sub-pixel data; perform color swapping on the plurality of new sub-pixel data; obtain each of the plurality of color swapped new sub-pixel data in sequence; select a corresponding gamma voltage according to the tag of the color swapped new sub-pixel data; and provide a source driving signal to a corresponding sub-pixel in a pixel array according to the color swapped new sub-pixel data and the corresponding gamma voltage.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates some related art types of color swapping;

FIG. 5 is a schematic diagram illustrating an example of new sub-pixel data, according to an embodiment of the present disclosure.

DETAILED DESCRIPTION

Figure 1:
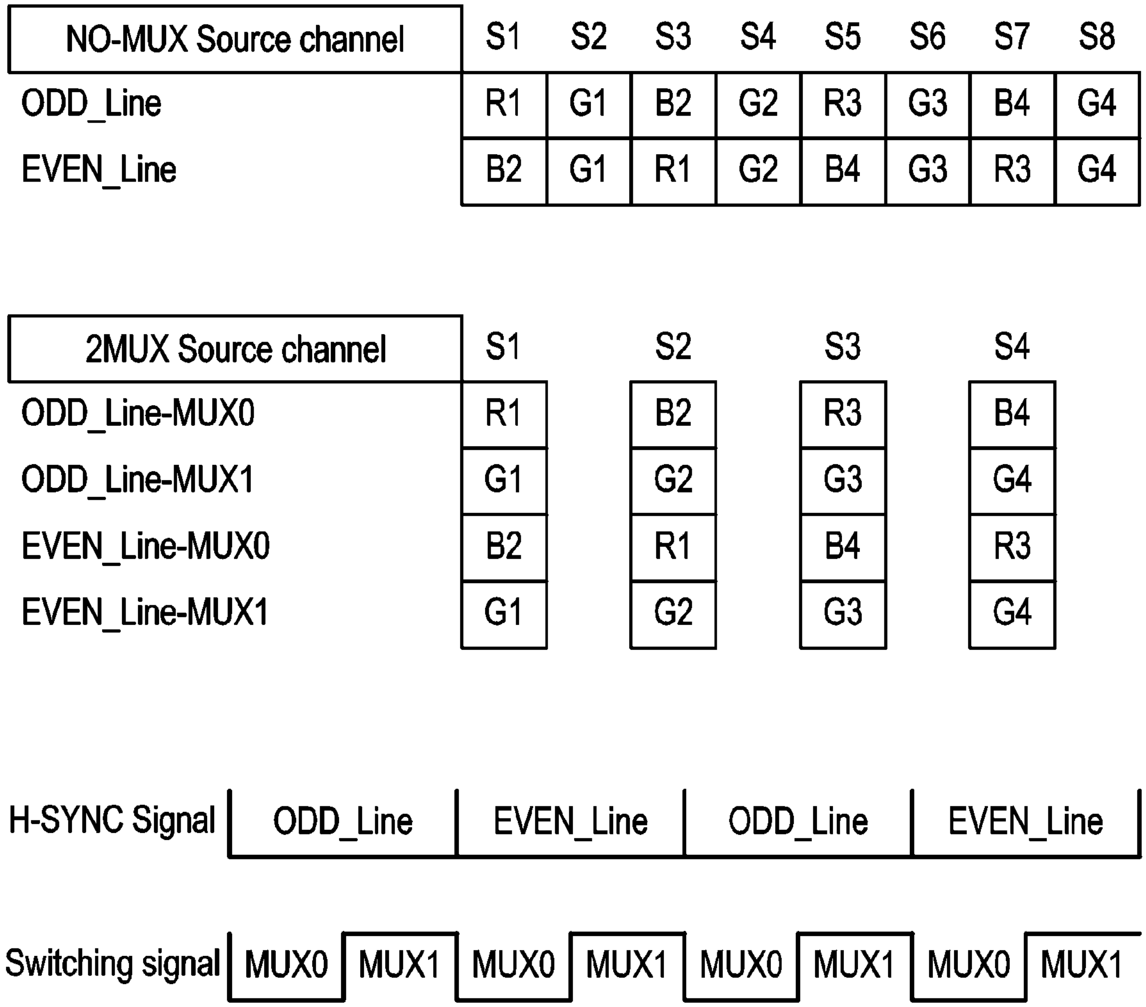
FIG. 1 is a diagram illustrating types of OLED panels.

The term “coupled (or connected)” as used throughout the specification of this disclosure (including claims of the present disclosure) may refer to any direct or indirect means of connection. For example, if it is described in the text that a first device is coupled (or connected) to a second device, it should be interpreted that the first device can be directly connected to the second device, or the first device can be indirectly connected to the second device through another device or some other connection means. Terms such as "first" and "second" mentioned in the full text of the description (including claims of the present disclosure) are used to name the elements or to distinguish different embodiments or scopes, rather than to limit the upper or lower limit of the number of elements, nor is it intended to limit the order of the elements. Also, where possible, elements/components/steps denoted by the same reference numerals in the drawings and embodiments represent the same or similar parts. Elements/components/steps that are denoted by the same reference numerals or the same terminology in different embodiments may serve as cross reference for each other.

FIG. 1 is a diagram illustrating types of OLED panels. As shown in FIG. 1, there may be two main types of OLED panels: no multiplexer (No-MUX) OLED panels and 2-to-1 multiplexer (2MUX) OLED panels. In FIGS. 1, S1 to S8 may represent source channels, R1 to R4, G1 to G4 and B1 to B4 may represent sub-pixels. FIG. 1 may illustrate sub-pixels connected to the source channels S1 to S8 and display lines ODD_Line and EVEN_Line in the No-MUX OLED panels, and 2MUX OLED panels.

The H-SYNC signal may control the scanning of odd-numbered lines ODD_Line and/or even-numbered lines EVEN_Line. When scanning is performed on the odd-numbered lines ODD_Line and/or even-numbered lines EVEN_Line on a 2MUX type panel, the switching signal may switch between the first state MUX0 and/or the second state MUX1 to control the scanning of the first part and/or the second part of the odd-numbered lines ODD_Line and/or even-numbered lines EVEN_Line. As a result, the 2MUX type panel may reduce the chip area based on time division (e.g., when compared to No-MUX type panels, the source channel may be reduced by half), but the display charging time for a high frame rate display quality may be poor (e.g., when compared to No-MUX type panels, the charging time may be reduced by half).

Since the output of the source channel mixes the RGB data and the gamma voltage, if the RGB data is subjected to color swapping, the gamma voltage may also need to be subjected to color swapping to match the correct RGB color.

FIG. 2 illustrates some related art types of color swapping. These related art types of color swapping, as illustrated in FIG. 2, may represent a small portion of known panel types, such as, but not limited to, PenTile™ panel types. For example, when taking into account support for other features, such as, but not limited to, Full Display Camera (FDC), patch cables, or source channel folding technology, there may be a large amount (e.g., more than 100) of types of color swapping.

Color swapping for gamma voltages may be implemented in a logic design and/or an analog design. However, whether the design is an analog design or a logic design, complex color swapping may increase the complexity, area, and/or error rate of a circuit design and may become a driving factor in the circuit design. Therefore, the present disclosure provides a source driver and a method for color swapping to achieve compatibility with various types of panels, and eliminate color swapping for gamma voltage thereby potentially reducing chip area and circuit complexity.

Figure 3:
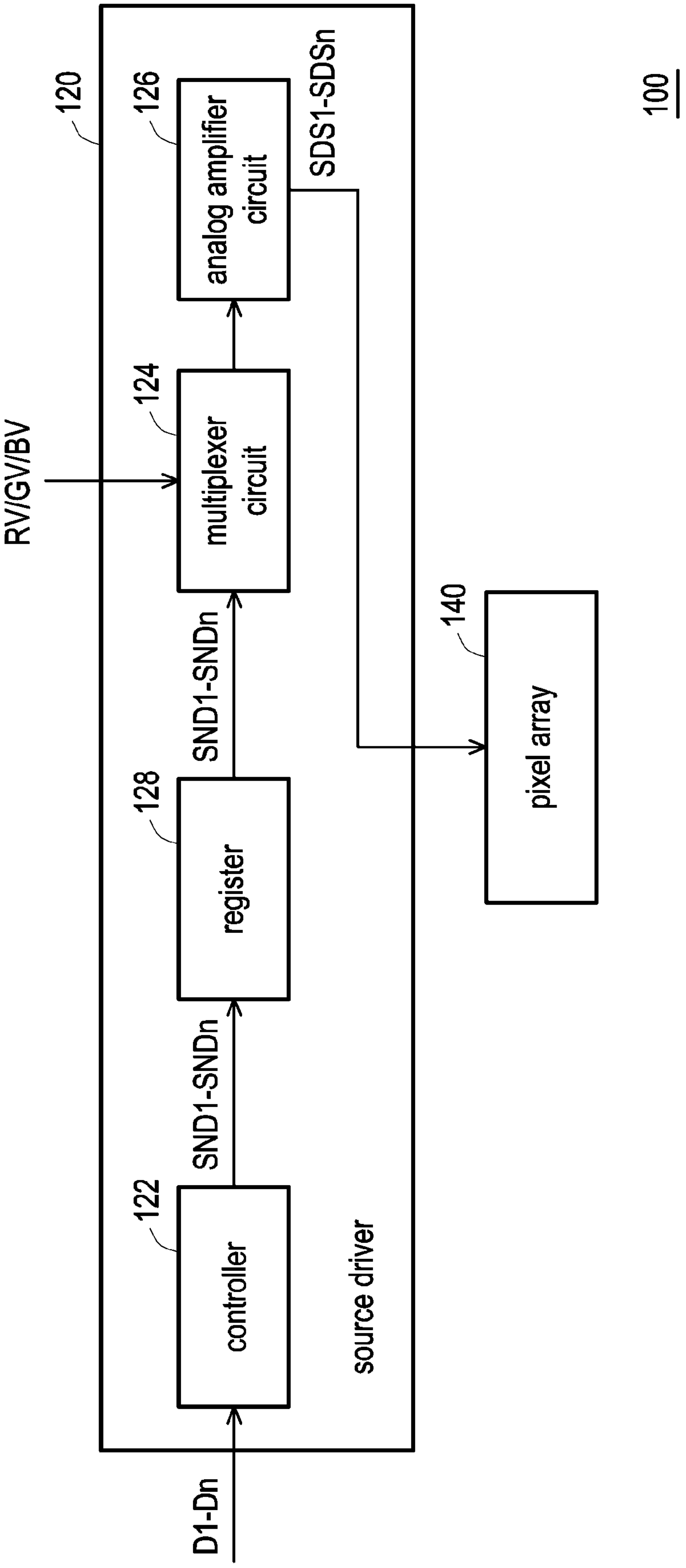
FIG. 3 is a schematic block diagram of a display panel, according to an embodiment of the present disclosure.

FIG. 3 is a schematic block diagram of a display panel according to an embodiment of the present disclosure. Referring to FIG. 3, the display panel 100 includes a source driver 120 and a pixel array 140. The display panel 100 may be, for example, a device with a display function such as a liquid-crystal display (LCD), a thin film transistor LCD (TFT-LCD) display, a light-emitting diode (LED) display, an OLED display, or a plasma display, but embodiments of the disclosure are not limited thereto.

In some embodiments, the source driver 120 may be coupled to the pixel array 140. The pixel array 140 may be an array including a plurality of sub-pixels arranged in a plurality of columns and rows. The source driver 120 may drive each column in the pixel array 140, and apply a plurality of source driving signals to the sub-pixels in the pixel array 140, respectively, to achieve a display effect.

The source driver 120 may include a controller 122, a multiplexer circuit 124, and an analog amplifier circuit 126. The multiplexer circuit 124 may be coupled between the controller 122 and the analog amplifier circuit 126. In an embodiment, the multiplexer circuit 124 may include multiple multiplexers, and the analog amplifier circuit 126 may include multiple analog amplifiers. In some embodiments, the number of the multiplexers may be the same as that of the analog amplifiers, and the multiplexers may be correspondingly coupled to the analog amplifiers. However, embodiments of the present disclosure are not limited thereto.

The controller 122 may include, for example, a central processing unit (CPU), or other programmable general-purpose or special-purpose microprocessors, digital signal processors (DSPs), programmable controllers, application specific integrated circuits (ASIC) or other similar devices or combinations of these devices. However, embodiments of the disclosure are not limited thereto. In some embodiments, the controller 122 may process data received from the outside (e.g., an application processor, another device, a computer, a tablet, a set-top box, a desktop personal computer (PC), a laptop PC, a workstation, a server, a mobile equipment, a personal digital assistant (PDA), a wearable device). For example, the controller 122 may load the firmware code from a storage device, so as to execute, in conjunction with the multiplexer circuit 124 and the analog amplifier circuit 126, the method for color swapping of the present disclosure. The method for color swapping is be described with reference to FIG. 4.

In an embodiment, the source driver 120 may further include a register 128. The register 128 may be coupled to the controller 122 and the multiplexer circuit 124 and may temporarily store the data processed by the controller 122.

Figure 4:
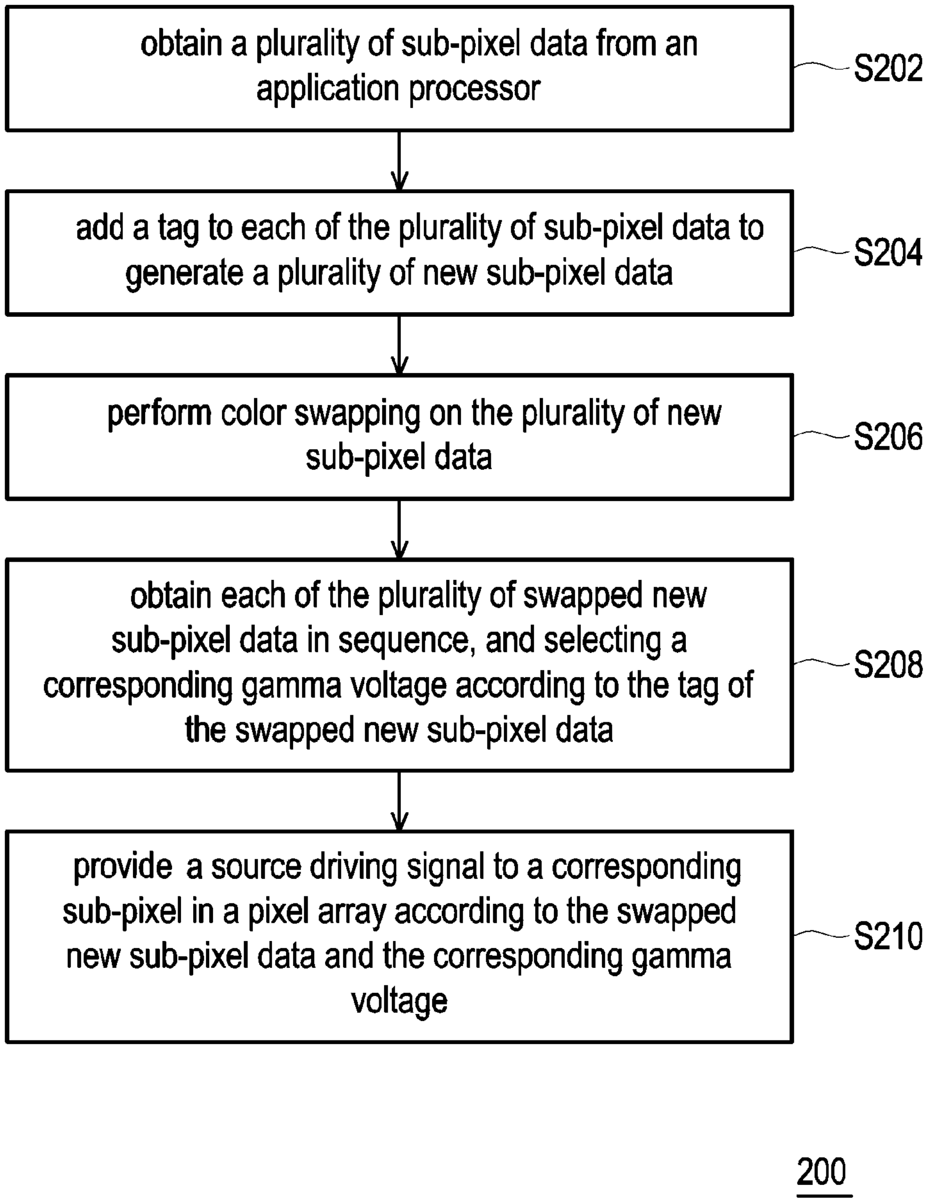
FIG. 4 is a schematic flowchart of a method for color swapping, according to an embodiment of the present disclosure.

FIG. 4 is a schematic flowchart of a method for color swapping according to an embodiment of the present disclosure. Referring to FIGS. 3 and 4, the method 200 may be adaptable for the display panel 100 of FIG. 3. The following describes detailed operations of the method for color swapping of the present disclosure in combination with the operation relationship between the devices in the display panel 100.

First, in operation S202, the controller 122 obtains a plurality of sub-pixel data D1-Dn from the application processor. In an embodiment, n is any positive integer.

In operation S204, the controller 122 adds a tag TAG to each sub-pixel data D1-Dn to generate a plurality of new sub-pixel data ND1-NDn. In some embodiments, the tag TAG may indicate the color information of the sub-pixel data D1-Dn.

Figure 5:
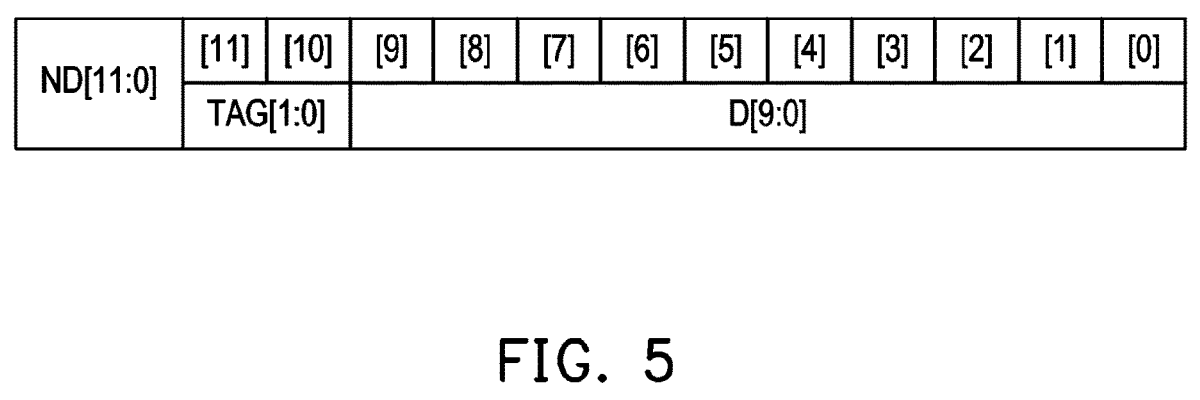

In an embodiment, the color information may include at least one of red R, green G, and blue B, and the tag TAG may be represented by two bits. However, embodiments of the present disclosure are not limited thereto. For example, the tag TAG may be represented by a smaller amount of bits or a larger amount of bits. FIG. 5 is a schematic diagram illustrating an example of new sub-pixel data according to an embodiment of the present disclosure. FIG. 5 shows an example in which the sub-pixel data D is 10 bits and a 2-bit tag TAG is added to the sub-pixel data D. As shown in FIG. 5, a tag TAG may be added to the sub-pixel data D to generate a new sub-pixel data ND. For example, when the color information of the sub-pixel data D is red R, the controller 122 may add '11' to the sub-pixel data D (e.g., tag TAG).

In operation S206, the controller 122 performs color swapping on the plurality of new sub-pixel data ND1-NDn. For example, after the controller 122 performs color swapping on the plurality of new sub-pixel data ND1-NDn, the controller 122 stores the color swapped new sub-pixel data SND1-SNDn in the register 128.

As described with reference to FIG. 5, the new sub-pixel data ND may include sub-pixel data D and a tag TAG. Performing color swapping on the plurality of new sub-pixel data ND1 to NDn may include performing color swapping on each of the plurality of sub-pixel data D1 to Dn and swapping the tag TAG of each of the new sub-pixel data ND1 to NDn to correspond the color swapping of the plurality of sub-pixel data D1 to Dn.

In an embodiment, after operation S206, the controller 122 may return to operation S202. That is, the controller 122 may continue to obtain the plurality of sub-pixel data D from the application processor, and perform operations S204 and S206 on the plurality of sub-pixel data D until the controller 122 obtains all of the sub-pixel data D and performs operations S204 and S206 on all of the sub-pixel data D. In some embodiments, all of the color swapped new sub-pixel data SND may have been stored in the register 128.

In operation S208, the multiplexer circuit 124 obtains each color swapped new sub-pixel data SND1-SNDn in sequence, and selects the corresponding gamma voltage according to the tag TAG of the color swapped new sub-pixel data SND1-SNDn. For example, the multiplexer circuit 124 obtains each color swapped new sub-pixel data SND from the register 128 in sequence, and selects the corresponding gamma voltage according to the tag TAG of the color swapped new sub-pixel data SND. In an embodiment, the gamma voltage is a gamma voltage RV corresponding to red color R, a gamma voltage GV corresponding to green color G, or a gamma voltage BV corresponding to blue color B.

According to the present embodiment, since the tag TAG of the color swapped new sub-pixel data SND is swapped to correspond to the color swapping of the sub-pixel data D, the gamma voltage may be color swapped by selecting the corresponding gamma voltage according to the TAG by the multiplexer circuit 124. That is, logic design or analog design for the color swapping of the gamma voltage may be simplified.

In operation S210, the analog amplifier circuit 126 provides the source driving signals SDS1-SDSn to the corresponding sub-pixels in the pixel array 140 according to the color swapped new sub-pixel data SND1-SNDn and the corresponding gamma voltages.

It is to be understood that, in some embodiments, aspects provided by the present disclosure may be applied to fingerprint recognition under screen, and the tag TAG indicating the color information of the sub-pixel data D may be combined with the bit indicating local high brightness mode (LHBM). That is, the bit indicating LHBM may be expanded from 1 bit to 2 bits. For example, when the tag TAG[1:0] is set to '11', the tag TAG may indicate that the color information of sub-pixel data D is red color R. For another example, when the tag TAG[1:0] is set to '10', the tag TAG may indicate that the color information of the sub-pixel data D is green color G. For another example, when the tag TAG[1:0] is set to '01', the tag TAG may indicate that the color information of the sub-pixel data D is blue color B. For another example, when the tag TAG[1:0] is set to '00', the tag TAG may indicate that LHBM is off.

In some embodiments, the tags TAG may also be color swapped in the order of color swapping. Therefore, the color swap function may be implemented in the logical design for better flexibility and support for a greater variety of panel types, such as, but not limited to, PenTile™, when compared to related systems. For example, in terms of analog design, some aspects of the present disclosure may only need to add a 2-bit decoder to select the corresponding gamma voltage without additionally color swapping the gamma voltage.

Based on the above, aspects provided by the present disclosure may potentially reduce chip area and circuit complexity, as well as, support many panel types for PenTile™ color swapping. Alternatively or additionally, implementing complex color swapping in logic designs may also be verified (e.g., using a field programmable gate array (FPGA)) before the integrated circuit is sent to manufacturing, thereby preventing undetectable errors.

It should be noted that the specific order and/or hierarchy of steps in the methods of the embodiments of the present disclosure are merely exemplary approaches. Based on preferences of design, the specific order or hierarchy of steps of the disclosed method or process may be rearranged while falling within the scope of the present embodiments. Accordingly, those of ordinary skill in the art will understand that the methods and techniques of the present embodiments are presented as various steps or actions in an exemplary order, and that the present embodiments are not limited to the specific order or hierarchy presented unless explicitly stated otherwise.

According to different design requirements, the implementation of the blocks of the source driver 120 and/or the controller 122 may be hardware, firmware, software (e.g., program), or a combination of multiple of the above three.

In terms of hardware, the blocks of the source driver 120 and/or the controller 122 may be implemented as logic circuits on an integrated circuit. The related functions of the source driver 120 and/or the controller 122 may be implemented in hardware using hardware description languages (such as, but not limited to, Verilog hardware description language (HDL) or very high speed integrated circuit (VHSIC) HDL (VHDL)) or other suitable programming languages. For example, the related functions of the source driver 120 and/or the controller 122 may be implemented in one or more controllers, microcontrollers, microprocessors, ASICs, DSPs, FPGAs, and/or various logic blocks, modules and circuits in other processing units.

In the form of software and/or firmware, the related functions of the source driver 120 and/or the controller 122 may be implemented as programming codes/computer program instructions. For example, the source driver 120 and/or the controller 122 may be implemented using general programming languages (e.g., C, C++, or assembly language) or other suitable programming languages. The program code/computer program instructions may be recorded/stored in a recording medium, for example, the recording medium includes a read only memory (ROM), a storage device and/or a random access memory (RAM). A computer, a CPU, a controller, a microcontroller or a microprocessor may read and execute the program code/computer program instructions from the recording medium to achieve related functions. As the recording medium, a "non-transitory computer readable medium", such as a tape, a disk, a magnetic card, a semiconductor memory, and a programmable logic circuit may be adopted. Furthermore, the program may be provided to the computer (or CPU) through any transmission medium (communication network, broadcast waves, or the like). The communication network is, for example, the Internet, wired communication, wireless communication, or other communication media.

As described above, the source driver and the method for color swapping provided by the embodiments of the present disclosure are able to add a tag for indicating color information to each sub-pixel data, and after color swapping is performed on the sub-pixel data, the corresponding gamma voltage may be selected directly according to the tag. As such, the source driver and method for color swapping of the present disclosure may reduce chip area and circuit complexity, and are compatible with different types of panels.

Although certain embodiments of the present disclosure have been described above, embodiments of the present disclosure are not limited thereto. One of ordinary knowledge in the technical field will readily understand that changes and modifications may be made to the embodiments without departing from the spirit and scope of the present disclosure. Therefore, the scope of the present disclosure shall be determined by the scope of the appended claims.

What is claimed is:

1. A source driver comprising: a processor configured to: obtain, from an application processor, a plurality of sub-pixel data, add a tag to each of the plurality of sub-pixel data to generate a plurality of new sub-pixel data, the tag indicating color information of the plurality of new sub-pixel data, and perform color swapping on the plurality of new sub-pixel data; a multiplexer circuit communicatively coupled to the processor and configured to: obtain each of the plurality of color swapped new sub-pixel data in sequence, and select a corresponding gamma voltage according to the tag of the plurality of color swapped new sub-pixel-data; an analog amplifier circuit communicatively coupled to the multiplexer circuit and configured to provide a source driving signal to a corresponding sub-pixel in a pixel array according to the plurality of color swapped new sub-pixel data and the corresponding gamma voltage; and a register communicatively coupled to the processor and the multiplexer circuit, wherein the processor is further configured to store, in the register, the plurality of color swapped new sub-pixel data, wherein the multiplexer circuit is further configured to obtain, from the register, the plurality of color swapped new sub-pixel data in sequence, wherein the processor is further configured to repeatedly obtain, from the application processor, pluralities of sub-pixel data, add tags to the pluralities of sub-pixel data, and perform color swapping on the pluralities of tagged sub-pixel data, and wherein the multiplexer circuit is further configured to repeatedly obtain, from the register, the color swapped pluralities of tagged sub-pixel data in sequence, until the processor has completed processing all of the sub-pixel data.

2. The source driver according claim 1, wherein the color information comprises at least one of a red value, a green value, and a blue value.

3. The source driver according to claim 1, wherein the tag is represented using two bits.

4. The source driver according to claim 1, wherein the tag further indicates a local high brightness mode (LHBM).

5. The source driver according to claim 4, wherein a first tag value indicates that the color information of a first corresponding sub-pixel is red, wherein a second tag value indicates that the color information of a second corresponding sub-pixel is green, wherein a third tag value indicates that the color information of a third corresponding sub-pixel is blue, and wherein a fourth tag value indicates that the LHBM of a fourth corresponding sub-pixel is off.

6. A method for performing color swapping, adaptable for a display panel, the method comprising: obtaining, from an application processor of the display panel, a plurality of sub-pixel data; adding a tag to each of the plurality of sub-pixel data to generate a plurality of new sub-pixel data, the tag indicating color information of the plurality of new sub-pixel data; performing color swapping on the plurality of new sub-pixel data; obtaining each of the plurality of color swapped new sub-pixel data in sequence; selecting a corresponding gamma voltage according to the tag of the plurality of color swapped new sub-pixel data; providing a source driving signal to a corresponding sub-pixel in a pixel array according to the plurality of color swapped new sub-pixel data and the corresponding gamma voltage; storing, in a register, the plurality of color swapped new sub-pixel data, repeatedly obtaining, from the application processor, pluralities of sub-pixel data, adding tags to the pluralities of sub-pixel data, and performing color swapping on the pluralities of tagged sub-pixel data; and obtaining, from the register, the color swapped pluralities of tagged sub-pixel data in sequence, until processing of all of the sub-pixel data has been completed, wherein the obtaining the plurality of color swapped new sub-pixel data in sequence comprises obtaining, from the register, the plurality of color swapped new sub-pixel data in sequence.

7. The method according to claim 6, wherein the color information comprises at least one of a red value, a green value, and a blue value.

8. The method according to claim 6, wherein the tag is represented using two bits.

9. The method according to claim 6, wherein the tag further indicates a local high brightness mode (LHBM).

10. The method according to claim 9, wherein a first tag value indicates that the color information of a first corresponding sub-pixel is red, wherein a second tag value indicates that the color information of a second corresponding sub-pixel is green, wherein a third tag value indicates that the color information of a third corresponding sub-pixel is blue, and wherein a fourth tag value indicates that the LHBM of a fourth corresponding sub-pixel is off.

11. A non-transitory computer-readable storage medium storing computer-executable instructions for performing color swapping by a display panel, the computer-executable instructions being configured to, when executed by at least one processor of the display panel, cause the display panel to: obtain, from an application processor, a plurality of sub-pixel data; add a tag to each of the plurality of sub-pixel data to generate a plurality of new sub-pixel data, the tag indicating color information of the plurality of new sub-pixel data; perform color swapping on the plurality of new sub-pixel data; obtain each of the plurality of color swapped new sub-pixel data in sequence; select a corresponding gamma voltage according to the tag of the plurality of color swapped new sub-pixel-data; provide a source driving signal to a corresponding sub-pixel in a pixel array according to the plurality of color swapped new sub-pixel data and the corresponding gamma voltage; store, in a register, the plurality of color swapped new sub-pixel data, when executed by the at least one processor of the display panel; repeatedly obtain, from the application processor, pluralities of sub-pixel data, add tags to the pluralities of sub-pixel data, and perform color swapping on the pluralities of tagged sub-pixel data; and obtain, from the register, the color swapped pluralities of tagged sub-pixel data in sequence, until processing of the pluralities of sub-pixel data has been completed, wherein to obtain the plurality of color swapped new sub-pixel data in sequence comprises to obtain, from the register, the plurality of color swapped new sub-pixel data in sequence.

12. The non-transitory computer-readable storage medium according to claim 11, wherein the color information comprises at least one of a red value, a green value, and a blue value.

13. The non-transitory computer-readable storage medium according to claim 11, wherein the tag is represented using two bits.

14. The non-transitory computer-readable storage medium according to claim 11, wherein the tag further indicates a local high brightness mode.

* * * * *